UNITED STATES PATENT OFFICE.

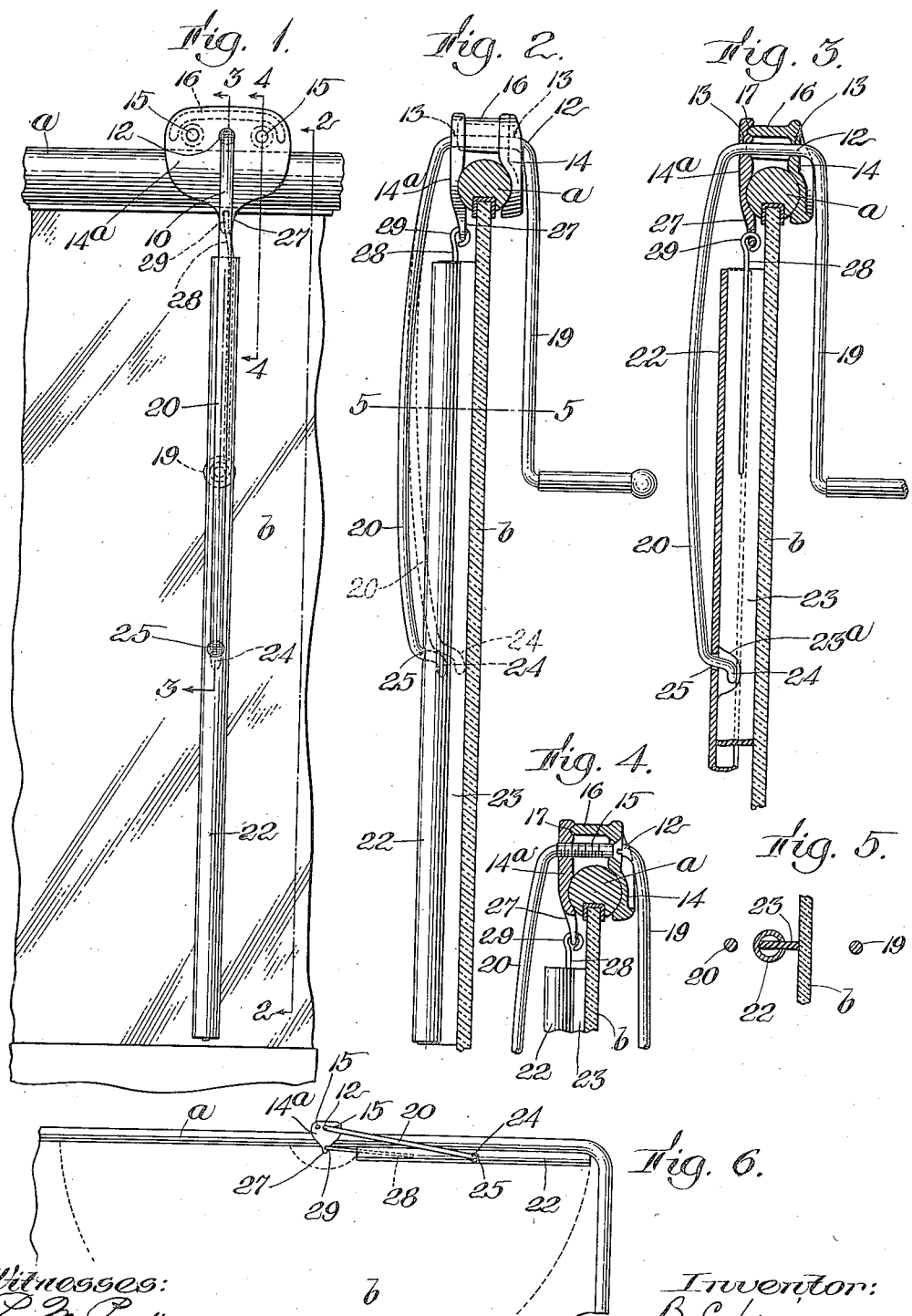

BENJAMIN C. LORING, OF DETROIT, MICHIGAN, ASSIGNOR, BY DIRECT AND MESNE ASSIGNMENTS, TO JOSEPH A. MOROSS AND ROSANNA C. LORING, TRUSTEES, OF DETROIT, MICHIGAN.

WIND-SHIELD CLEANER.

1,153,848.

Specification of Letters Patent. Patented Sept. 14, 1915.

Application filed October 14, 1914. Serial No. 866,617.

*To all whom it may concern:*

Be it known that I, BENJAMIN C. LORING, a citizen of the United States, residing at Detroit, in the county of Wayne and State of Michigan, have invented certain new and useful Improvements in Wind-Shield Cleaners, of which the following is a specification.

This invention relates to means for wiping or scraping a portion of the front side of a motor vehicle wind-shield to restore the transparency of the shield by removing moisture and dirt from the front side thereof, the cleaning means being operable by the driver of the vehicle while occupying his usual seat.

The invention is embodied in a cleaning device, including an elongated scraper, an oscillatory arm maintaining the scraper in yielding contact with the front side of a wind shield and adapted to move the scraper across a predetermined part of the shield, the scraper being separable from the arm when swung to a predetermined position relatively to the arm, and means loosely connecting the inner end of the scraper with a fixed support on a wind shield to cause the scraper to swing with the arm and prevent the scraper from swinging to position for separation from the arm, said means being separable from the scraper to permit separation of the latter from the arm.

The invention consists in the improvements which I will now proceed to describe and claim.

Of the accompanying drawings, forming a part of this specification, Figure 1 represents an elevation of a portion of the front side of a wind shield equipped with a cleaner embodying my invention. Fig. 2 represents a section on line 2—2 of Fig. 1. Fig. 3 represents a section on line 3—3 of Fig. 1. Fig. 4 represents a section on line 4—4 of Fig. 1. Fig. 5 represents a section on line 5—5 of Fig. 2. Fig. 6 represents an elevation on a reduced scale of a portion of the front side of a wind shield and a cleaner mounted thereon, the cleaner being at one extreme of its oscillating movement.

The same letters of reference indicate the same parts in all of the figures.

In the drawings, *a* represents the frame and *b* the glass of the wind shield, which may be of any suitable construction.

The cleaner of my invention includes a bearing adapted to support a rock-shaft 12 extending crosswise of the wind shield. Said bearing, in the preferred embodiment of the invention here shown, is formed by the walls of orifices 13, (Fig. 3), formed in two jaws 14, 14ª, which are adapted to bear on opposite sides of the frame *a*, and are adjustably connected by screws 15, the inner jaw 14 having a rib or flange 16, seated in a groove 17 in the outer jaw 14ª, as shown by Fig. 4. Said flange covers the space between the upper ends of the jaws and prevents said upper ends from moving toward each other when the screws 15 are turned to cause the lower portions of the jaws to grip the frame *a*.

The rock-shaft 12 is provided at one end with an operating crank or handle 19, whereby it may be rocked in its bearing, said handle being at the inner side of the shield, and at the other end with a resilient arm 20, which projects over the outer side of the shield and is normally under tension, tending to press its outer end inwardly toward the shield, as indicated by dotted lines in Fig. 2. The rock-shaft 12, handle 19, and arm 20, are preferably made from a single resilient substantially U-shaped metal rod, bent as shown, the handle and arm projecting in the same direction from the rock-shaft, and constituting stops coöperating with the bearing in preventing endwise displacement of the rock shaft which is formed by the neck portion of the U-shaped rod.

The acting or cleaning member is an elongated scraper which is composed of a tubular sheet metal back 22, having a longitudinal slot in one side and a blade 23 of flexible material, preferably rubber, inserted in said slot, as shown by Fig. 5, the outer edge of the blade projecting from the back and bearing against the outer side of the shield *b*. There is a separable hinge connection between the scraper and the arm 20, said connection permitting the scraper to swing in various directions relative to the arm, the acting edge of the scraper blade being thus permitted to bear along its entire length on the shield, and the scraper as a whole being adapted to stand out of parallelism with the arm 20, as indicated by Fig. 6, when the scraper is at one extreme of its movement, and lies parallel with a portion of the frame *a*. The said separable hinge connection is preferably composed of an angular hook 24, formed on the outer end of the arm 20 and constituting one member of the connection, and a hole or eye 25 in the scraper back 22 at about its longitudinal center and constituting the other member of the connection, the said eye and hook being loosely interengaged. The blade 23 is recessed at 23ª (Fig. 3) to permit the hook 24 to bear on the inner portion of the back 22. In assembling the parts the scraper is interposed between the arm 20 and the shield, and its hook is inserted in the eye 25. This operation springs the arm 20 outwardly from the dotted line position to the full line position shown by Fig. 2, so that the arm positively exerts an inward pressure on the scraper, holding the edge of the blade 23 in close contact with the shield $b$ along its entire length.

It will now be seen that when the arm 20 is oscillated by a rocking movement of the rock-shaft 12 in its bearing, the scraper is moved with the arm. It is evident, however, that, since the hook 24 is adapted to turn in the eye 25, some form of controlling means is required to maintain the scraper in the operative position relatively to the arm 20, represented by Figs. 1 and 2, so that the scraper will be caused by the oscillations of the arm to move sidewise in a curved path, as indicated by dotted lines in Fig. 6. The preferred form of controlling means is that represented by the drawings, said means comprising a rigid ear 27, formed on the jaw 14ª, and projecting below the same, and a wire confining rod 28 having an eye 29 loosely engaged with the ear 27 and projecting into the tubular back 22 of the scraper, the scraper being free to move lengthwise, relatively to the rod. In other words, the scraper and rod are slidingly connected. When the parts are in the position shown by Figs. 1 and 2, the ear 27 and rod 28 maintain the scraper in a position substantially parallel with the arm 20. When the parts are in the position shown by Fig. 6, the scraper being at one extreme of its movement and in close proximity to the frame $a$, the ear 27 and rod 28 permit the scraper to stand out of parallelism with the arm 20. When the scraper is in the position last described, it offers practically no obstruction to the view of the operator through the shield.

When the device is operated, a movement of the scraper from the position shown by Fig. 6 to that shown by Fig. 1 gradually brings the scraper into parallelism with the arm 20. The ear 27 and rod 28 at all times control the position of the scraper and cause it to move sidewise in the predetermined path indicated, the scraper in approaching either end of its movement assuming a position out of parallelism with the arm 20, as indicated by Fig. 6.

The tension of the arm 20, the separable hinge connection between said arm and the scraper, and the scraper-controlling means are designed to maintain a uniform pressure of the entire edge of the scraper blade 23 against the shield, regardless of wear of said edge, the scraper being pressed inwardly by the arm sufficiently to compensate for such wear until the blade is entirely worn out.

When the bearing is detached from the shield, the scraper may be separated from the arm 20 and confining rod 28 by first turning the bearing on the rock-shaft to withdraw the rod from the scraper back (the rod being sufficiently loose in the back to permit this operation), and then swinging the scraper to swing its upper end to the right as viewed in Fig. 2. The latter operation causes the wall of the orifice 25 to slide off from the hook 24. Provision is therefore made for quickly and conveniently removing the scraper to permit the removal of a worn blade 25 and the substitution of a new blade therefor. The scraper is reëngaged with the arm 20 and confining rod 28 by a reversal of the described operations, the scraper back being first engaged with the hook 24, and the bearing being then turned on the rock-shaft to cause the rod to enter the back, as shown by Fig. 1.

It will be seen that when the rod is inserted in the back, it prevents the back from being swung in the direction required to separate the back from the arm 20, the back being removable from the hook 24 only by a swinging movement in a given direction, that is, in a direction which moves the upper end of the back to the right as viewed in Fig. 2. This movement of the back is also prevented by the shield when the bearing is attached to the shield. No positive fastenings such as bolts, screws and nuts are used to separably connect the scraper with the carrying arm and bearing, so that the scraper is applicable to and separable from the carrying arm and bearing without the use of tools and by a minimum expenditure of time.

The bearing, the rock-shaft 12, the handle 19, the carrying arm 20, and the scraper connected as shown with the bearing and the carrying arm, constitute a wind shield attachment adapted to be installed on a wind shield by the operation of attaching the bearing to the shield, the scraper being maintained in separable engagement with the carrying arm and bearing as described, when the bearing is removed from the shield.

I do not limit myself to the described means for connecting the rock-shaft bearing with the shield frame. It is obvious that said bearing may be a bushing inserted in an orifice formed for its reception within the frame, particularly when the latter is made of wood.

The described construction enables a folding shield to be folded in either direction, and enables a sliding shield to be moved vertically, as usual, without obstruction by the cleaner to either of said movements.

I claim:

1. A wind shield cleaner comprising a bearing adapted to be detachably secured to a wind shield frame, a rock-shaft journaled in the bearing and having at one end a handle and at the other end a wiper-carrying arm, a wiper composed of a slotted tubular back and a blade engaged therewith, said back and carrying arm having complemental members forming a separable hinge connection between the central portion of the back and the outer end of the arm, one member being slidable on the other to permit the separation of the back from the arm only when the back is swung in a given direction relatively to the arm, and a wiper-confining connection between the bearing and the inner end portion of the wiper back, causing the wiper to swing with the arm, normally preventing the wiper from swinging to position for separation, and separable from the back to permit the separation of the back from the arm.

2. A wind shield cleaner comprising a bearing adapted to be detachably secured to a wind shield frame, a rock-shaft journaled in the bearing and having at one end a handle and at the other end a wiper-carrying arm, a wiper composed of a slotted tubular back and a blade engaged therewith, said back and carrying arm having complemental members forming a separable hinge connection between the central portion of the back and the outer end of the arm, one member being slidable on the other to permit the separation of the back from the arm only when the back is swung in a given direction relatively to the arm, and a confining rod jointed to the bearing and extending therefrom into the inner end portion of the back to cause the back to swing with the arm and prevent the back from swinging to position for separation, said rod having a sliding engagement with the back and being removable therefrom to permit the separation of the back from the arm.

3. A wind shield cleaner comprising a bearing adapted to be detachably secured to a wind shield frame, a rock-shaft journaled in the bearing and having at one end a handle and at the other end a wiper-carrying arm, a wiper composed of a slotted tubular back and a blade engaged therewith, the back being provided with an orifice at its central portion and the arm with a hook slidable in said orifice and formed to permit the separation of the back from the arm only when the back is swung to a given position relatively to the arm, and a confining rod jointed to the bearing and extending therefrom into the inner end portion of the back to cause the back to swing with the arm and prevent the back from swinging to position for separation, said rod having a sliding engagement with the back and being removable therefrom to permit the separation of the back from the arm.

4. A wind shield cleaner comprising a bearing adapted to be detachably secured to a wind shield frame, a rock-shaft journaled in the bearing and having at one end a handle and at the other end a wiper-carrying arm, a wiper composed of a slotted tubular back and a blade engaged therewith, said back and carrying arm having complemental members forming a separable hinge connection between the central portion of the back and the outer end of the arm, one member being slidable on the other to permit the separation of the back from the arm only when the back is swung in a given direction relatively to the arm, and a wiper-confining connection between the bearing and the inner end portion of the wiper back, causing the wiper to swing with the arm, normally preventing the wiper from swinging to position for separation, and separable from the back to permit the separation of the back from the arm, said rock-shaft, handle and arm being composed of a resilient U-shaped wire rod, the neck portion of which constitutes the rock-shaft, while the handle and arm portions constitute stops coöperating with the bearing in preventing endwise displacement of the rock-shaft.

In testimony whereof I have affixed my signature, in presence of two witnesses.

BENJAMIN C. LORING.

Witnesses:
JOHN D. HARGER,
CORNELIA L. LORING.